United States Patent [19]
Lau et al.

[11] Patent Number: 5,621,833
[45] Date of Patent: Apr. 15, 1997

[54] SUPERPOSITION OF TWO-DIMENSIONAL ARRAYS

[76] Inventors: Ronnie C. Lau, 17009 Paula La., Lutz, Fla. 33549; Patrick E. Crane, 13706 Chestersall Dr., Tampa, Fla. 33634

[21] Appl. No.: 489,437

[22] Filed: Jun. 12, 1995

[51] Int. Cl.$^6$ .................................................. G02B 6/00
[52] U.S. Cl. ........................... 385/50; 385/146; 385/131
[58] Field of Search ..................................... 385/129, 130, 385/131, 132, 146

[56] References Cited

U.S. PATENT DOCUMENTS

| | | |
|---|---|---|
| 4,648,606 | 3/1987 | Segawa . |
| 4,746,179 | 5/1988 | Dahne et al. . |
| 4,789,642 | 12/1988 | Lorenzo et al. .................... 385/131 |
| 4,823,331 | 4/1989 | Yoshitoshi et al. . |
| 5,050,946 | 9/1991 | Hathaway et al. ................. 385/146 |
| 5,140,651 | 8/1992 | Soref et al. . |
| 5,163,118 | 11/1992 | Lorenzo et al. .................... 385/131 |
| 5,202,950 | 4/1993 | Arego et al. ...................... 385/146 |
| 5,303,322 | 4/1994 | Winston et al. .................... 385/146 |
| 5,321,774 | 6/1994 | Barnard et al. . |
| 5,329,601 | 7/1994 | Nakamura . |
| 5,506,929 | 4/1996 | Tai et al. ......................... 385/146 |

*Primary Examiner*—John Ngo
*Attorney, Agent, or Firm*—James Creighton Wray

[57] ABSTRACT

Stackable waveguides provide for spaced superposition of multiple two-dimensional planar arrays while closely packing pixels in an array. Multiple ports of each waveguide accommodate a collimated beam input. The beam is reflectively split to allow control or detection by strategically placed two-dimensional arrays of control or sensing elements. These elements may be any number of different kinds of control devices or, if used to receive, detectors. One embodiment of the present invention has six port modules horizontally and vertically stacked with other six port modules. The devices can be stacked in such a way that the chip carriers can be caused not to interfere with each other. Circuits and two-dimensional arrays are spaced within the stacks while the outputs are tightly packed. Multiple port module configurations are horizontally and vertically stacked to produce a tightly packed array of programmable pixels.

19 Claims, 3 Drawing Sheets

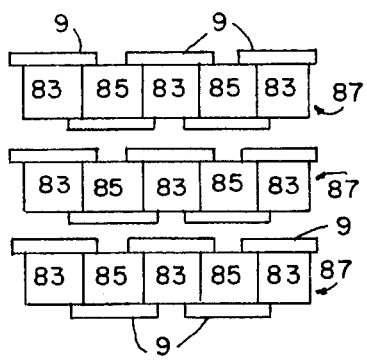
FIG. 12
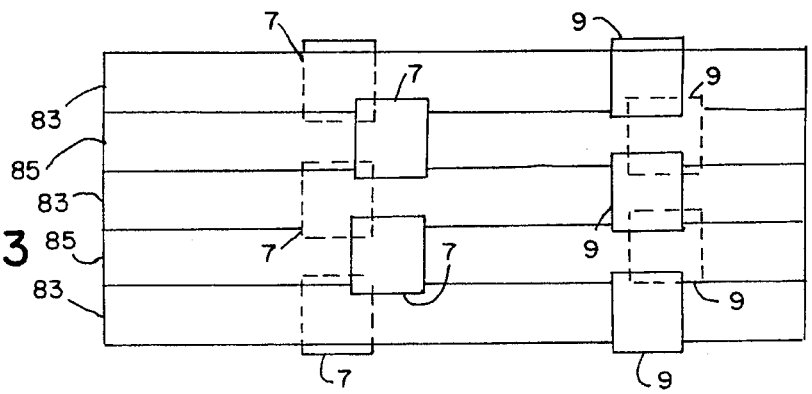
FIG. 13
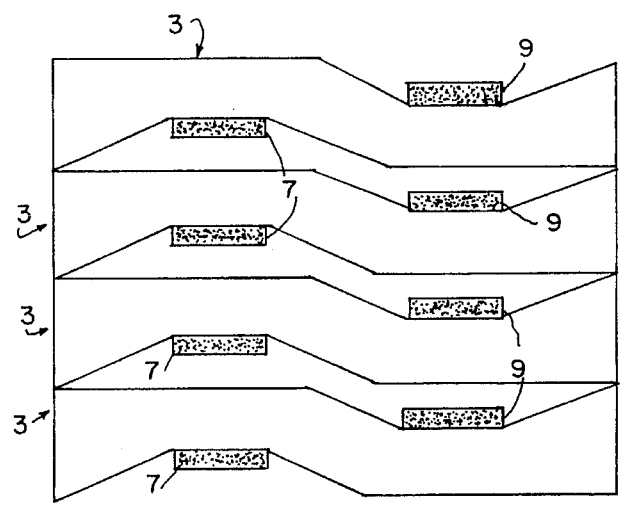
FIG. 14
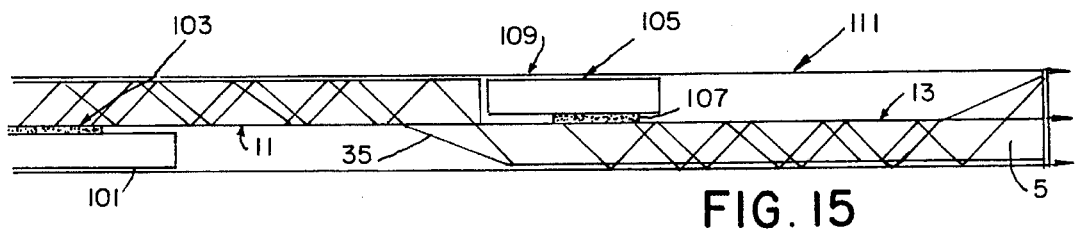
FIG. 15
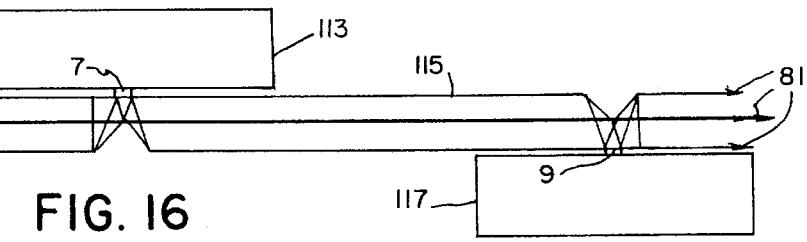
FIG. 16
FIG. 17
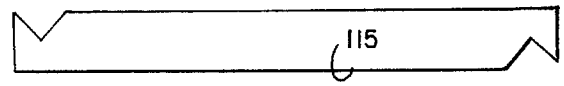

SUPERPOSITION OF TWO-DIMENSIONAL ARRAYS

BACKGROUND OF THE INVENTION

This invention relates to all fields of art that use two-dimensional planar arrays of devices to store and/or transfer information, including optics, radar, antennas, radiometry, x-rays, and microscopy, among others.

Many applications of two-dimensional arrays are limited by the number of achievable pixels. Needs exist in signal processing, holography, infrared and optical cameras, phased arrays, and other systems for devices capable of achieving larger two-dimensional arrays. Virtually all persons having interests in sensor systems will be interested in those devices.

Technological constraints have seriously hampered the development of large two-dimensional arrays. It is necessary in the superpositioning of arrays to eliminate any dead space between pixels that is in excess of inter pixel dead space in the individual arrays being superpositioned. Those dead spaces are generally caused by structures to which the arrays must be attached and are necessary for electrical connection to the individual pixels. Those structures make it impossible to place the arrays in a contiguous manner. Consequently, existing two-dimensional array size is limited to array technology size constraints. Therefore, if an infrared detector array size limit is 256×256 pixels, the maximum sensor array size, without dead space, is 256×256. Needs exist for devices that provide for the superposition of multiple two-dimensional arrays having an unlimited number of pixels in the arrays.

Spacial light modulators (SLMs) use Liquid Crystal Light Valve (LCLV) technologies in which each liquid crystal pixel is programmable for its aperture control through a high speed driver. SLMs are either reflective or transmissive. Transmissive SLMs are very large and are not amenable to superpositioning applications. Reflective SLMs have been limited to very small arrays. Needs exist for unlimited two-dimensional arrays that maximize the pixel counts of LCLV.

Efforts to create larger two-dimensional arrays by stacking have been unsuccessful. Since SLMs have non-active edges, stacking two SLMs side-by-side to form a multi-port module is not effective. The only way to place SLMs in the same plane is to position the SLMs facing, or opposing, a common plan, thereby creating a multi-port module.

Reflective SLMs are surrounded by wiring on all four sides of their active surfaces. The perimeter housings of the SLMs contain all the signal wirings and connections. That makes it impossible to position two single-port modules side-by-side, since the SLM edges of the modules would be in contact, thereby disallowing the medium blocks to touch. Dead spaces between the pixels result, thus limiting detector array size. Needs exist for multi-port modules containing multiple SLMs that are vertically and horizontally stackable.

SUMMARY OF THE INVENTION

This invention provides for the superposition of multiple two-dimensional planar arrays such that current technology does not limit the number of pixels/elements in the array. This invention relates to achieving larger two-dimensional arrays of various kinds than can be provided by available technology.

An optical waveguide structure uses multiple ports for the accommodation of a collimated beam input. The beam input is reflectively split and recombined to allow control by strategically placed two-dimensional arrays of control or sensing elements. Those elements can be detectors, spatial light modulators, or any of a number of other kinds of control devices. One of the six port devices combines two two-dimensional arrays. The six port devices are then stacked vertically and horizontally such that the chip carriers and SLMs do not interfere with each other. No dead space exists between the devices, thus producing an infinite array of programmable light pixels.

The present invention has applications in all fields where two-dimensional arrays are used. Applications exist in the areas of signal processing, infrared and optical cameras and phased arrays. Importantly, the stacked devices can synthesize dynamic imagery, thereby providing for advancements in the field of holography. The collimated beam, when exiting the module, is broken up into a large array of programmed optical pixels travelling in phase. From those pixels, holograms are produced. Since each hologram can be down-loaded from the SLM driver memory in a rapid frame by frame manner, motion in the holograph is achieved.

These and further and other objects and other features of the invention are apparent in the disclosure, which includes the above and ongoing written specification, with the claims and the drawings.

BRIEF DESCRIPTION OF THE DRAWINGS

FIG. 12 is a cross-sectional schematic illustration of the embodiment shown in FIG. 11 taken along the line 12—12 in FIG. 11.

FIG. 13 is a plan view of the FIG. 11 embodiment showing locations of the two-dimensional control arrays.

FIG. 14 is a schematic elevation showing two-dimensional stacking of modules having six ports, as shown in FIG. 1.

FIG. 15 schematically shows a stackable laser diode module.

FIG. 16 schematically shows a two port module for a large array.

FIG. 17 schematically shows two side-by-side stacking to produce an array of 1.17 million pixels.

DETAILED DESCRIPTION OF THE PREFERRED EMBODIMENTS

Figure 1:
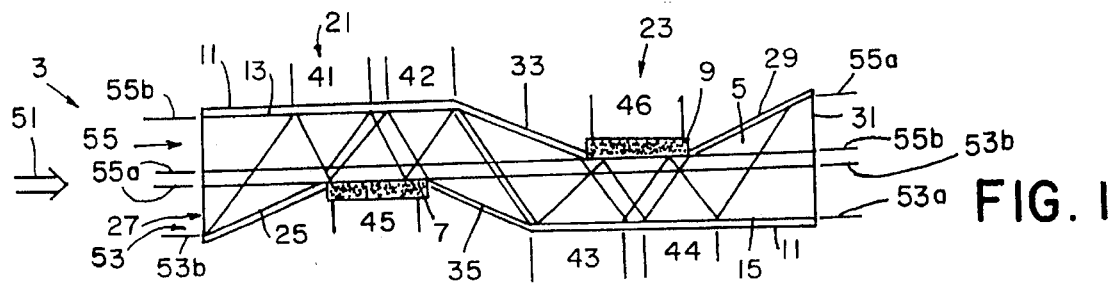
FIG. 1 shows one embodiment of a stackable module having 6 ports.
Figure 2:
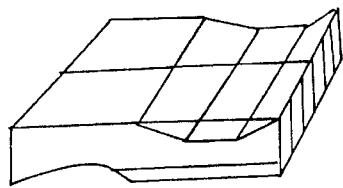
FIG. 2 is a schematic representation of a perspective view of stacked modules.
Figure 3:
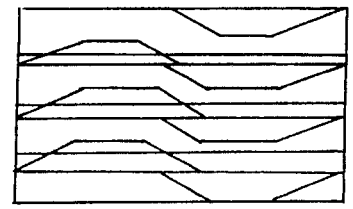
FIG. 3 is a schematic representation of a side view of stacked modules.
Figure 4:
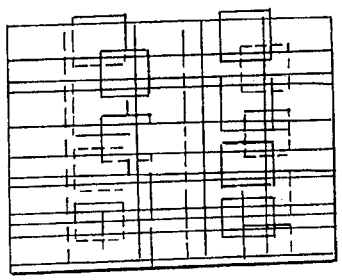
FIG. 4 is a schematic representation of a top view of stacked modules.
Figure 5:
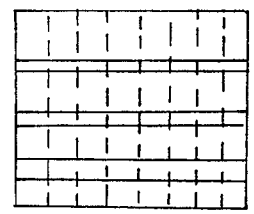
FIG. 5 is a schematic representation of an end view of stacked modules.

Referring to FIG. 1 a multiple multi-port optical waveguide "Indented Prism" module is generally indicated by the numeral 3. Each module 3 has a transparent medium block 5 and a pair of opposing two-dimensional control or detector arrays 7, 9. The block 5 has a 100% reflective surface 11 on both the top side 13 and bottom side 15 except in areas 45, 46 where the two opposing control arrays 7, 9 are placed. Each block 5 has at least six ports. The opposing control arrays 7, 9 are strategically positioned such that two configurations of modules 3 are stackable horizontally and vertically without any interference.

An optical waveguide 3 provides for the superposition of multiple two-dimensional planar arrays 7 and 9 such that current technology does not limit the number of pixels in the array. Waveguide 3 uses multiple ports 41–46 for the accommodation of a collimated beam input 51 which is reflectively split 53, 55 and recombined 57 to allow control by strategically placed two-dimensional arrays 7, 9 of control or sensing elements. Those elements may be any number of different kinds of control devices or, if used for receiving, detectors. The simplest form of the invention is shown in FIG. 1, where the collimated beam 51 enters from the left face 27 into a glass prism 3. Half 53 of the beam 51 is split upwards at surface 25, reflecting off surface 41 to illuminate a two-dimensional control array 7 at surface 45. The controlled energy is then reflected to surface 42 and surface 35 before appearing at the exit surface 31 as represented by rays 53*a* and 53*b*. The rest 55 of beam 51 is allowed to pass by surfaces 25, 41, 45, and 42 before impinging on surface 33, where beam 55 is diverted downward in a similar fashion to reflect off surface 43 toward two-dimensional control surface 46. The controlled energy is then reflected to surfaces 40 to 44 and 29 before appearing at the exit surface 31 as represented by rays 55*a* and 55*b*.

One of these six port devices can combine two-dimensional arrays 7 and 9. The six port waveguides 3 are then stackable as shown in FIGS. 2–5 in such a way that the chip carriers can be caused not to interfere with each other.

A number of other manifestations of the present invention include use for combining active laser diode arrays and receiving focal plane arrays.

The block 5 is made of a homogenous material or a combination of different materials. Preferred embodiments of the present invention 1 have transparent blocks 5 made of glass or plastic. The block 5 is molded or cut in a shape dimensionally proportional to the size of the port where the control arrays 7, 9 are positioned. The block 5 can be a one piece structure or a multiple assembled component structure.

Preferred embodiments of the present invention have block 5 designs as shown in the drawings. The block 5 has a left portion 21 and a right portion 23.

The left portion 21 contains at least 2 ports on its top side 13 and at least one port on its bottom side 15. The ports are spaced apart to allow for clearance of the control array edges. A sloped portion 25 extends upward from bottom of the left end 27 to the left control or detector port 7.

The right portion 23 of the medium block 5 contains at least one port on its top side 13 and at least two ports on its bottom side 15. A sloped portion 29 extends downward from the top of the right end 31 of the block 5 to a control or detector port 9 on the top side 13. A sloped portion 33 extends upward from the port 9 on the top side 13 of the right portion 23 and connects the top side 13 of the right portion 23 to the top side 13 of the left portion 21. A sloped portion 35, having an identical slope to the sloped portion 33, extends upward from the bottom side 15 of the right portion 23 and connects the bottom side 15 of the right portion 23 to the bottom side 15 of the left portion 21. The sloped portion 33 and the sloped portion 35 lie in parallel planes. All sloped portions of the block 5 are at β/2 degrees, where β degrees is the typical reflection angle of the beams off the ports of the block 5. The top side 13 and the bottom side 15 of the medium block 5, except for areas where control arrays 7, 9 are positioned, are covered with a 100% reflective surface 11.

FIG. 1 shows one embodiment of a module 3 having six ports. Port 41 and port 42 are positioned on the top side 13 of the left portion 21 of the block 5. Port 45 is positioned on the bottom side 15 of the left portion 21 of the block 5. Port 46 is positioned on the top side 13 of the right portion 23 of the block 5. Port 43 and port 44 are positioned on the bottom side 15 of the right portion 23 of the block 5. A first two-dimensional control array 7 is positioned at port 45. A second two-dimensional control array 9 is positioned at port 46. A collimated beam 51 enters the left end entrance face 27 of the module 3. A first half 53 of the beam 51 is split upwards at the sloped portion 25, reflects off port 41 and illuminates the two-dimensional control array 7 positioned at port 45. The controlled energy is then reflected to Port 42 and from Port 42 to the sloped portion 35. The sloped portion 35 directs the energy out the right end exit face 31 of the block 5. The second half 55 of the beam 51 enters the left end entrance face 27 of the block 5 and is allowed to pass by ports 41, 42 and 45 and the sloped portion 25. The second half 55 of the beam 51 impinges on the sloped portion 33 of the block 5. The beam 55 is diverted downward, reflects off port 43, and illuminates the two-dimensional control array 9 on port 46. The controlled energy is then reflected to port 44 and from port 44 to the sloped portion 29. The sloped portion 29 directs the energy out the right end 31 of the block 5.

Figure 6:
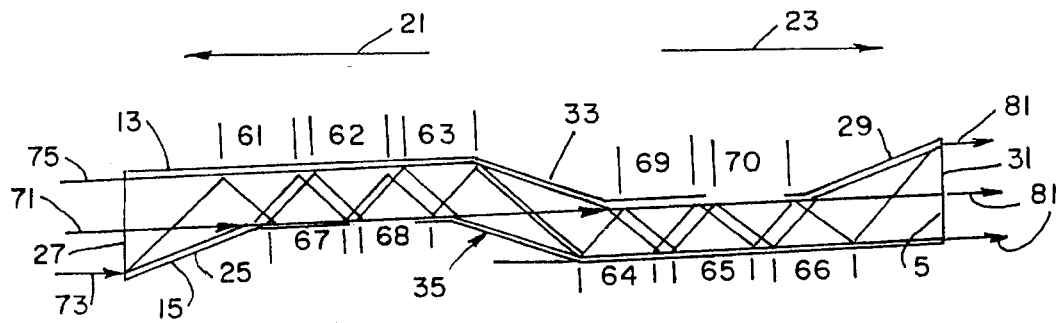
FIG. 6 shows a second embodiment of a stackable module having ten ports.

FIG. 6 shows a second embodiment of the present invention 1 wherein the module 3 has ten ports. Port 61, port 62 and port 63 are positioned on the top side 13 of the left portion 21 of the block 5. Port 67 and port 68 are positioned on the bottom side 15 of the left portion 21 of the block 5. Port 69 and port 70 are positioned on the top side 13 of the right portion 23 of the block 5. Port 64, port 65 and port 66 are positioned on the bottom side 15 of the right portion 23 of the block 5. A collimated light beam 71 enters at the left end entrance face 27 of the module 3. The shape of the block 5 separates the beam 71 into an upper beam 75 and a lower beam 73. The upper beam 75 passes through the left portion 21 of the block 5 until it is reflected on the sloped portion 33. The beam 75 is diverted downward and reflects off ports 64, 69, 65, 70 and 66, in that order. From port 66, the beam 75 is reflected toward the sloped portion 29 and the exit face 31, where the beam 75 exits as a programmed energy beam. The lower beam portion 73, upon entering the left end entrance face 27 of the block 5, impinges immediately on the sloped portion 25. The beam 73 is directed upward and is reflected off ports 61, 67, 62, 68 and 63, in that order. From port 63, the beam 73 reflects off the sloped portion 35 as a programmed energy beam, passes through the right portion 23 of the block 5 and exits the module 3 from the lower portion of the right end exit face 31.

Figure 7:
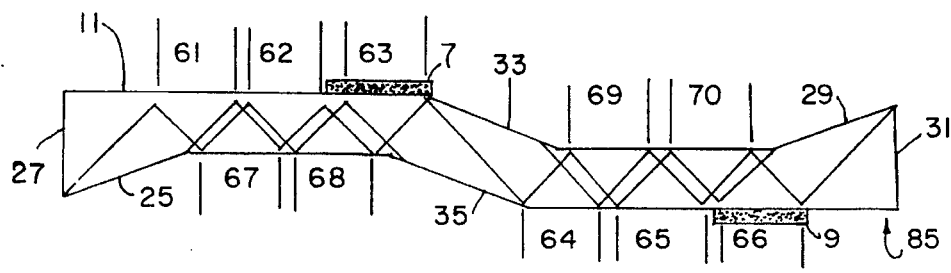
FIG. 7 shows a ten port stackable module with two-dimensional control arrays having a first control port configuration.
Figure 8:
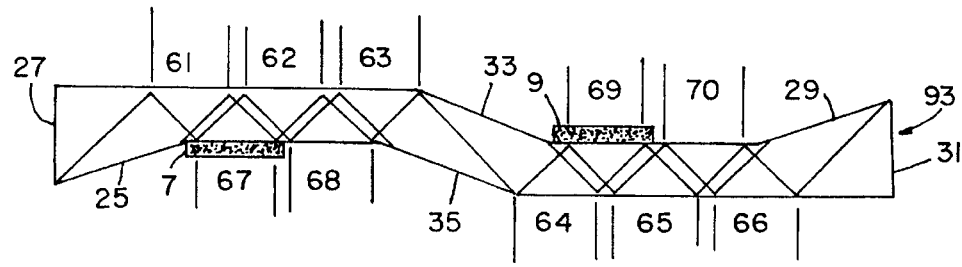
FIG. 8 shows a ten port stackable module with two-dimensional control arrays having a second control port configuration.
Figure 9:
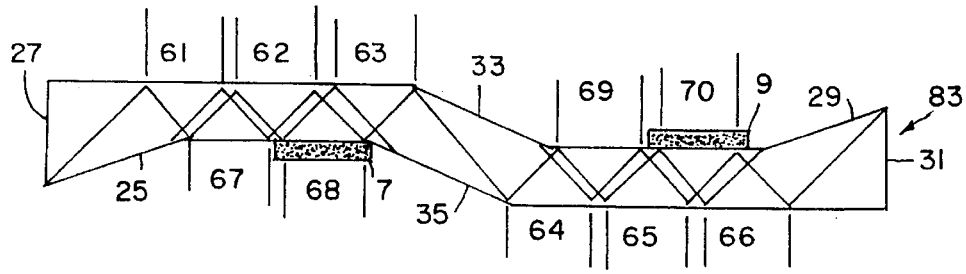
FIG. 9 shows a ten port stackable module with two-dimensional control arrays having a third control port configuration.

FIGS. 7–9 show possible module configurations for the embodiment shown in FIG. 6. In FIG. 7, a first two-dimensional control array 7 is positioned at port 63 and a second two-dimensional control array 9 is positioned at port 66. In FIG. 8, a first two-dimensional control array 7 is positioned at port 67 and a second two-dimensional control array 9 is positioned at port 69. In FIG. 9, a first two-dimensional control array 7 is positioned at port 68 and a second two-dimensional control array 9 is positioned at port 70. The configuration shown in FIG. 7 is horizontally stackable with the configurations shown in FIGS. 8 and 9, and is vertically stackable with configurations similar to itself. The configuration shown in FIG. 8 is vertically stackable with the configuration shown in FIG. 9 and with configurations similar to itself. The configuration shown in FIG. 9 is vertically stackable to the configuration shown in FIG. 8 and with configurations similar to itself. The embodiments shown in FIGS. 7–9 render future possibilities for multi-color augmentation and for up-grade units where back-up two-dimensional control arrays may be necessary.

The exiting beams 81 carry information from two separate two-dimensional control arrays 7, 9. When the modules 3 are stacked together vertically and horizontally leaving no dead space between them, an infinite array of programmable light pixels is produced.

Figure 10:
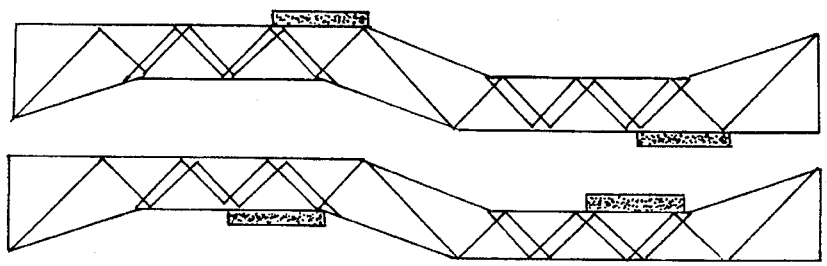
FIG. 10 schematically shows 3×5 stacking using distinct modules.
Figure 11:
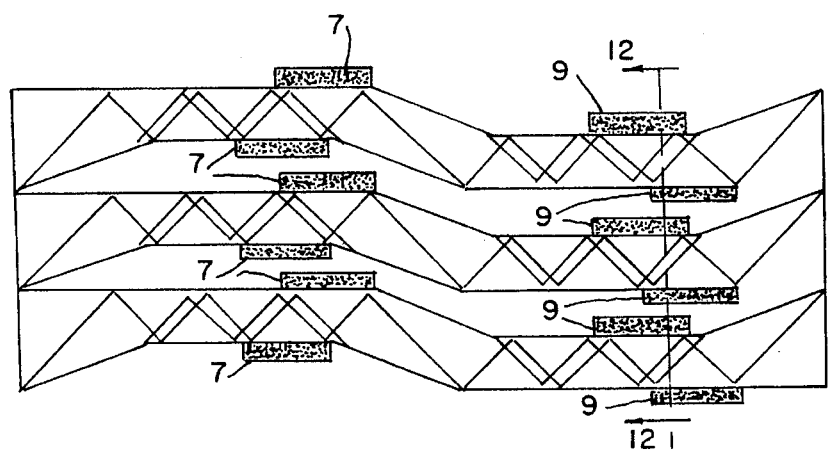
FIG. 11 schematically shows two-dimensional stacking of modules.

Multiple modules 3 are stacked horizontally and vertically as schematically shown in FIG. 10. FIGS. 11–13 show an embodiment of the present invention having modules 3 stacked together three high and five wide. Alternating vertical stacks of waveguides 83 and 85, in FIG. 7 and FIG. 9 configurations, are joined side-by-side. Each row 87 has modules 83 and 85, in FIG. 9 and FIG. 7 configurations respectively, alternately placed. Column A has all modules 83 in FIG. 9 configurations, and Column B has all modules 85 in FIG. 7 configurations. Similar to the relationship between Column A and Column B, Columns C, D and E continue to alternate in horizontal progression. In a second embodiment, alternating stacks of modules 93 and 85 in FIG. 8 and FIG. 7 configurations are joined side-by-side. In a third embodiment, alternating vertical stacks of modules 85 with FIG. 7 configurations and vertical stacks having a mixture of modules 93 and 83 with FIG. 8 and FIG. 9 configurations are joined side-by-side.

As shown in FIGS. 12 and 13, the two-dimensional control arrays 7, 9 extend beyond the edges 95 of the modules 3 and overlap the horizontally connected modules 3. No two arrays 7, 9 come into contact, however, thereby eliminating any interference.

FIG. 14 shows an embodiment of the present invention having multiple six port modules 3, as shown in FIG. 1, vertically and horizontally stacked. The two-dimensional control arrays 7, 9 do not interfere with each other, thereby allowing for an unlimited number of pixels in the resultant array.

As shown in FIG. 15, the block 5 can be slightly modified to enable small slabs of laser diodes in two-dimensional arrays 7, 9 to radiate within the block 5. In one embodiment, the sloped portion 33 is removed from the block 5. A first laser diode slab 101 is connected by a forty-five degree deflection grating 103 to the bottom side 15 of the left portion 21 of the block 5 at the left end 27. A second laser diode slab 105 is connected by a forty-five degree deflection grating 107 to the top side 13 of the right portion 23 of the block 5 near the middle 109 of the block 5. A housing/heat sink 111 encloses both laser diode slabs 101, 105 and the entire block 5. Each laser diode slab 101, 105 functions as an LCLV pixel, with its energy generated to replace the single collimated beam. That laser diode modular block 109 has a similar effect of stackability in an infinite magnitude if all the individual laser diodes radiate in phase.

FIGS. 16 and 17 schematically illustrate a two-port module for creating a large array. A first two-dimensional, 640×480 control array 7 and a second two-dimensional, 640×480 control array 9 are positioned on the block 115. A circuit board and interface 113 is connected to the first array 7 and a similar circuit board and interface 117 is connected to the second array 9. Two side-by-side stackings of the blocks 115 produce 1.23 million pixels.

While the invention has been described with reference to specific embodiments, modifications and variations of the invention may be constructed without departing from the scope of the invention, which is defined in the following claims.

We claim:

1. An optical waveguide apparatus comprising a block, the block having a left end, a right end, a left portion and a right portion, the left portion having a first top side, a first bottom side, at least two ports on the first top side, at least one port on the first bottom side, and a first sloped portion extending upward between a bottom of the left end of the block and a port on the first bottom side, and the right portion having a second top side, a second bottom side, at least one port on the second top side, at least two ports on the second bottom side, and a fourth sloped portion extending downward between a top of the right end of the block and a port on the second top side, a third sloped portion extending downward between the first top side and the second top side, a second sloped portion extending downward between the first bottom side and the second bottom side, the second sloped portion and the third sloped portion being parallel to each other, a first two-dimensional array positioned on a port on the left portion, a second two-dimensional array positioned on a port on the right portion, the first array and the second array positioned on opposing sides of the block, and a reflective surface covering the first top side, the second top side, the first bottom side, the second bottom side, the first sloped portion, the second sloped portion, the third sloped portion and the fourth sloped portion, except for areas where the first two-dimensional array and the second two-dimensional array are positioned.

2. The apparatus of claim 1, wherein the block is made of a homogenous material.

3. The apparatus of claim 1, wherein the block is made from a combination of materials.

4. The apparatus of claim 1, wherein the block is made of a transparent material.

5. The apparatus of claim 4, wherein the block is made of a transparent material selected from the group consisting of glass and plastic.

6. The apparatus of claim 1, wherein the block has a first port and a second port positioned on the first top side of the left portion, a third port and a fourth port positioned on the second bottom side of the right portion, a fifth port positioned on the first bottom side of the left portion, a sixth port positioned on the second top side of the right portion, the first two-dimensional array positioned at the fifth port, and the second two-dimensional array positioned at the sixth port.

7. The apparatus of claim 1, wherein the block has a first port, a second port, and a third port positioned on the first top side of the left portion, a fourth port, a fifth port, and a sixth port positioned on the second bottom side of the right portion, a seventh port and an eighth port positioned on the first bottom side of the left portion, and a ninth port and a tenth port positioned on the second top side of the right portion.

8. The apparatus of claim 7, wherein the first two-dimensional array is positioned at the seventh port, and the second two-dimensional array is positioned at the ninth port.

9. The apparatus of claim 7, wherein the first two-dimensional array is positioned at the third port, and the second two-dimensional array is positioned at the sixth port.

10. The apparatus of claim 7, wherein the first two-dimensional array is positioned at the eighth port, and the second two-dimensional array is positioned at the tenth port.

11. The apparatus of claim 1, wherein the ports are spaced to allow for edges of the first array and the second array to extend beyond edges of the ports.

12. A multiple waveguide apparatus for creating an infinite array of programmable light pixels comprising multiple waveguides stacked together horizontally and vertically, each waveguide further comprising a block, the block having a left end, a right end, a left portion and a right portion, the left portion having a first top side, a first bottom side, at least two ports on the first top side, at least one port on the first bottom side, and a first sloped portion extending upward between a bottom of the left end and a port on the first bottom side, and the right portion having a second top side, a second bottom side, at least one port on the second top side, at least two ports on the second bottom side, and a second sloped portion extending downward between a top of the right end and a port on the second top side, a third sloped portion extending downward between the first top side and the second top side, a fourth sloped portion extending downward between the first bottom side and the second bottom side, the third sloped portion and the fourth sloped portion being parallel to each other, a first two-dimensional array positioned on a port on the left portion, a second two-dimensional array positioned on a port on the right portion, the first two-dimensional array and the second two-dimensional array positioned on opposing sides of the block, and a reflective surface covering the first top side, the second top side, the first bottom side, the second bottom side, the first sloped portion, the second sloped portion, the third sloped portion and the fourth sloped portion, except for areas where the first two-dimensional array and the second two-dimensional array are positioned and respective top sides and bottom sides of adjacent blocks and the ports thereon are spaced from each other.

13. The apparatus of claim 12, wherein the block has a first port, a second port, and a third port positioned on the first top side of the left portion, a fourth port, a fifth port, and a sixth port positioned on the second bottom side of the right portion, a seventh port and an eighth port positioned on the first bottom side of the left portion, and a ninth port and a tenth port positioned on the second top side of the right portion.

14. The apparatus of claim 13, further comprising alternating stacks of waveguides, a first stack of identical waveguides vertically connected, each waveguide in the first stack having the first two-dimensional array positioned at the eighth port and the second two-dimensional array positioned at the tenth port, and a second vertical stack of waveguides, horizontally connected to the first stack, the second stack further comprising identical waveguides, each having the first two-dimensional array positioned at the third port and the second two-dimensional array positioned at the sixth port.

15. The apparatus of claim 13, further comprising alternating stacks of waveguides, a first stack of identical waveguides vertically connected, each waveguide in the first stack having the first two-dimensional array positioned at the seventh port and the second two-dimensional array positioned at the ninth port, and a second vertical stack of waveguides, horizontally connected to the first stack, the second stack further comprising identical waveguides, each having the first two-dimensional array positioned at the third port and the second two-dimensional array positioned at the sixth port.

16. The apparatus of claim 13, further comprising alternating stacks of waveguides, a first stack of waveguides vertically connected, the first stack comprising alternating configurations of waveguides wherein a first waveguide has the first two-dimensional array positioned at the seventh port and the second two-dimensional array positioned at the ninth port and a second waveguide has the first two-dimensional array positioned at the eighth port and the second two-dimensional array positioned at the tenth port, and a second vertical stack of waveguides, horizontally connected to the first stack, the second stack further comprising identical waveguides, each having the first two-dimensional array positioned at the third port and the second two-dimensional array positioned at the sixth port.

17. A stackable laser diode module comprising a medium block, the block having a left end, a right end, a left portion and a right portion, the left portion having a first top side, a first bottom side, at least two ports on the first top side, at least one port on the first bottom side, and a first sloped portion extending upward between the left end of the block and a port on the first bottom side, and the right portion having a second top side, a second bottom side, at least one port on the second top side, at least two ports on the second bottom side, and a second sloped portion extending downward between the right end of the block and a port on the second top side, a fourth sloped portion extending downward between the first bottom side and the second bottom side, a first two dimensional array positioned on a port on the left portion, a second two dimensional array positioned on a port on the right portion, the first array and the second array positioned on opposing sides of the block, a first laser diode slab, a first deflection grating for connecting the first slab to the first bottom side of the left portion of the block, a second laser diode slab positioned near a middle of the block, a second deflection grating for connecting the second slab to the second top side of the right portion of the block, and a heat sink for housing the block and the first and second laser diode slabs and gratings.

18. A method for superimposing two-dimensional arrays for creating a tightly packed array of programmable light pixels comprising directing a beam into an entrance end of a waveguide, splitting the beam into a first upper beam portion and a second lower beam portion, reflecting the second lower beam portion successively from a first sloped surface of the waveguide, a first port, a second port carrying a first two-dimensional array, a third port, and a second sloped surface, and conducting the second lower beam portion out of the waveguide through an exit end, conducting the first upper beam portion through the waveguide by passing the first sloped surface, the first, second and third ports and the second sloped surface, and reflecting the first upper beam portion successively from a third sloped surface, a fourth port, a fifth port carrying a second two-dimensional array, a sixth port, and a fourth sloped surface, and providing the first beam portion and the-second beam portion separately as the beam portions exit the waveguide.

19. A method for superimposing two-dimensional arrays for creating a tightly packed array of programmable light pixels comprising directing a beam into an entrance of a waveguide, splitting the beam into a first upper beam portion and a second lower beam portion, reflecting the second lower beam portion successively from a first sloped surface of the waveguide, a first port, a second port, a third port, a fourth port, a fifth port, and a second sloped surface, conducting the second beam portion through a remainder of the waveguide and outward through an exit, conducting the second beam portion through a portion of the waveguide by passing the first sloped surface, the first, second, third, fourth and fifth ports, and the second sloped surface, reflecting the upper beam successively from a third sloped surface, a sixth port, a seventh port, an eighth port, a ninth port, a tenth port, and a fourth sloped surface, and directing the first upper beam portion through the exit, and collecting the first beam portion and the second beam portion as the beam portions exit the waveguide.

* * * * *